CARRY RESTORING CIRCUITRY
Filed June 20, 1963 2 Sheets-Sheet 1
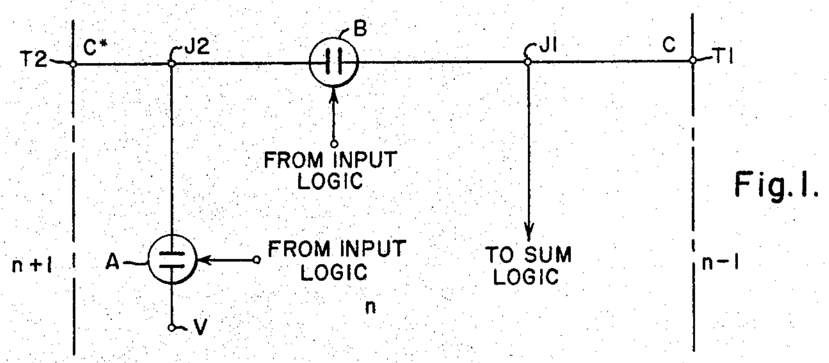
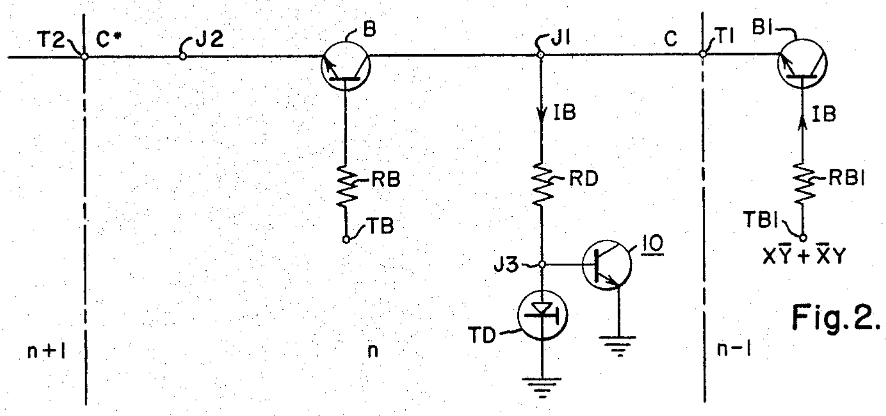
Fig. 2.
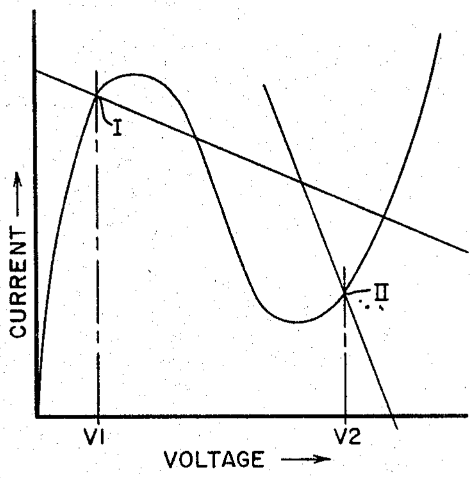
Fig. 3.
WITNESSES:
Bernard R. Gregory
A Samuel Ott
INVENTOR
Auseklis Brastins
BY Ernest P. Klipfel
ATTORNEY Oct. 11, 1966 A. BRASTINS 3,278,735

CARRY RESTORING CIRCUITRY

Filed June 20, 1963 2 Sheets-Sheet 2

United States Patent Office 3,278,735
Patented Oct. 11, 1966

3,278,735

CARRY RESTORING CIRCUITRY

Auseklis Brastins, Swissvale, Pa., assignor to Westinghouse Electric Corporation, Pittsburgh, Pa., a corporation of Pennsylvania Filed June 20, 1963, Ser. No. 289,286
7 Claims. (Cl. 235—175)

The present invention relates to adder circuitry for use in computers, and more particularly to carry restoring circuitry for use in high speed adder stages of a computer.

Among the desirable properties that an adder stage of a computer should have are: high speed, a large number capacity of digits and few components. These factors become increasingly important as the art becomes more sophisticated. In presently known computers a compromise often has to be made, sacrificing some of the desirable qualities in order to obtain one of the advantages. There are two modes by which two binary numbers may be added, namely, serially and in parallel. In a serial-type adder, two digits of the same order and the carry digit from the adjacent lower order are added at a time, starting from the least significant digit. The sum digit is stored and the carryout digit is added to the two digits of the next higher order. All the digits of the two numbers must be processed through a single logic circuit; thus, the addition of two $n$-digit numbers requires at least $n$-digit periods when being added serially. Even though the logic circuitry of the serial-type adder is simple and the number of digits is unlimited, this method is relatively slow and offers no room for increased speed.

The parallel-type adder requires a full adder logic circuit for each order of an $n$-digit number. All digits of the augend and addend are simultaneously presented to the adder. Even though the input digits are simultaneously presented in the adder stages, the speed of addition of a parallel-type adder is not $n$ times faster than that of a serial-type adder. There is some delay in the addition process in that each stage of the adder must wait for the carry signal from the adjacent lower order stage before the sum digit of that stage can be generated. The carry propagation time of each stage therefore becomes a limiting factor in the speed of conventional parallel-type adders. This is so even if the carry delay for each stage is, a small fraction of the digit period. There are various approaches by which the speed of parallel adder stages may be increased. One of these is by increasing the speed of the logic elements themselves. This may be done by using faster transistors and semiconductor elements operating in the non-saturating mode. The overall gain in speed, however, is limited. Moreover, non-saturating logic elements are difficult to design. This is especially true for use in future computers, where functional monolithic or molecular block logic elements are intended for use. Another method of increasing the speed of the addition function is to reduce the carry delay per adder stage. A common method is to compute from the input digits the carry for each stage separately rather than obtaining it from the previous adder stage. This method requires a large number of components. As the number of digits increases, the geometric growth of the components required becomes prohibitive for reasons of cost and reliability. Other methods are also available such as storing the carry signals or bypassing certain groups of adder stages. These, however, offer little speed advantage at the considerable cost of additional logic components.

Recently investigated binary full adder circuitry utilizes saturable transistor switches in the carry propagation line. Such circuitry has the capability of propagating the carry signal almost simultaneous to all stages of the adder. Carry propagation paths are set up within a stage depending upon only the input digits to the particular stage. Since transistors in their saturated state act as conductors, the usual turn-on and turn-off delay is eliminated for the propagation of the carry signal. The carry signal is only transmitted after a transistor carry switch has been set to provide a conductive path therefor. On further investigation of saturated carry transistor adder circuitry, it was found, however, that the number of usable adder stages was limited because of deterioration of the carry signal due to voltage drops across the saturated transistor switches. The voltage drops necessitated the use of booster transistors in the carry propagation line after every few stages. The use of the booster transistors seriously impaired speed of the adder and, of course, increased the complexity of the circuitry.

It is, therefore, an object of the present invention to provide new and improved high speed adder circuitry.

It is a further object of the present invention to provide new and improved high speed carry adder circuitry usable in a large number of stages without the need for booster means between stages.

It is a further object of the present invention to provide new and improved high speed adder circuit incorporating therein carry restoring elements providing unlimited increase in the number of stages without carry signal deterioration and without seriously impairing speed of operation.

Boardly, the present invention provides high speed adder circuitry for use in computer stages in which carry restoring circuitry is utilized in each of the stages to maintain the carry line potential at a high value so that a carry signal may be propagated through or used by a great number of stages without attenuation.

These and other objects will become more apparent when considered in view of the following specification and drawings, in which:

FIGURE 1 is a schematic-symbolic diagram of a carry switching arrangement;

FIG. 2 is a schematic diagram of a carry restoring circuit;

FIG. 3 is a plot of the characteristics of a tunnel diode utilized in the present invention;

Figure 4:
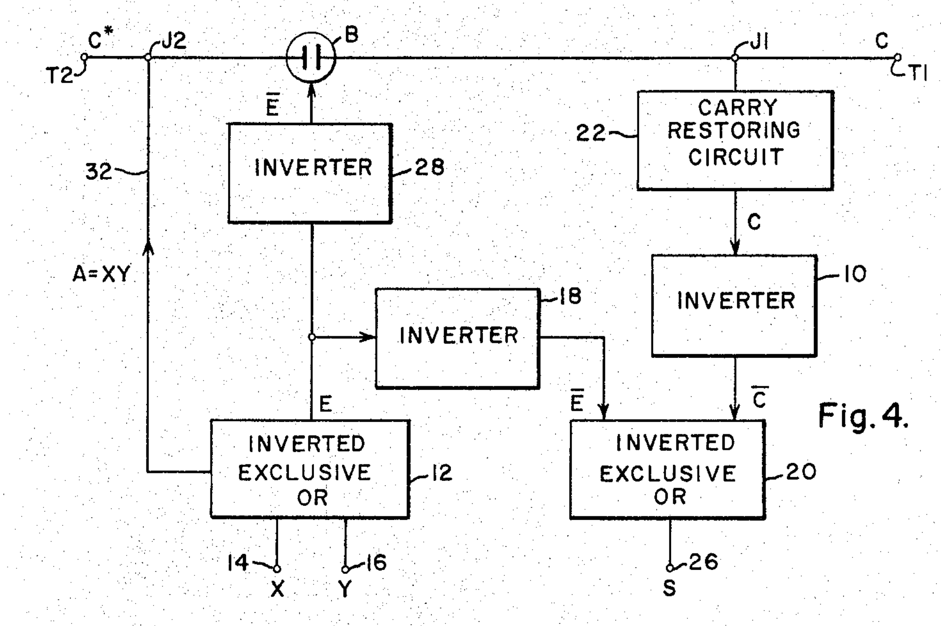
FIG. 4 is a block diagram of an adder stage utilizing carry restoring circuitry.

Referring to FIGURE 1, a carry switching arrangement is shown in which a carry propagating conducting path is provided nearly simultaneously through all stages of an adder. A single carry switching stage is shown in FIGURE 1, the state $n$, shown, is preceded by a similar stage $n-1$ to the right of the dotted line at a terminal T1 and succeeded by a similar stage $n+1$ to the left of the dotted line at a terminal T2. Switch B is connected between the terminals T1 and T2 with the carry propagation line being established therethrough. Switch B is operated from "input logic" components, not shown. A connection is provided at the junction J1 to "sum logic" components, not shown, of the adder stage. A switch A is connected between a junction J2 on the carry line and a supply voltage source V and is operated from "input logic" components, not shown, of the adder stage. The switches A and B for each stage are set by logic components in accordance with input digits X and Y to that stage only. The switches are set according to the following truth table for binary addition:

| X | Y | C | S | C* |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

In the above table, X and Y are the input augend and addend signals, C is the carry input signal to the stage applied at the terminal T1 from the stage $n-1$, S is the sum signal of the stage and C* is the carry output signal of the stage applied to the terminal T2 to be transmitted to the next succeeding stage $n+1$. It can be seen from the truth table that an adder stage has to propagate an incoming carry signal C, if one is present, when one of the input signals X or Y is at a 1 binary state. The stage must generate its own carry output signal C* when both inputs X and Y are at a 1 binary state.

It follows that the logic functions for the operation of the switches A and B are:

$$A=XY$$

$$B=X\overline{Y}+\overline{X}Y$$

The carry output signal C* may be expressed by:

$$C^*=A+BC$$

Once the carry switches A and B for all stages of the adder have been set according to the simultaneous input signals to all stages, the sum logic circuits of all stages then receive their carry signals within the very short time required for the carry signal to propagate along the preset conducting paths.

The Boolean expressions on the generation of the sum signals can be seen by reference to the truth table. The sum S is in a "1" binary state with both inputs either at a "1" or "0" state when a carry signal C is present, i.e., is at a "1" state, from the previous stage, and with one of the inputs in a "1" state when there is a no carry signal, i.e., a "0" carry signal, from the previous stage.

Any of the well known logic elements may be used in order to generate the sum and carry signals in accordance with the truth table. Specific circuitry will be shown below incorporating the necessary logic elements to generate the required signals. The logic functions necessary to be performed by a given stage may be summarized as:

$$A=XY$$

for generating a carry signal C*.

$$B=\overline{E}=X\overline{Y}+\overline{X}Y$$

for propagating a carry signal C as C*, where $B=\overline{E}$, and $$S=EC+\overline{EC}$$

for forming the sum digit of the input digits.

The carry propagation time in the circuit of FIG. 1 is very short because after presetting it provides a direct propagation path for carry signals. Presetting is done simultaneously in all stages, and the speed of addition is therefore nearly the same as that of a single stage for a moderate number of stages. The switches A and B may be saturating transistors which provide a ready conductive path therethrough when in their saturated state. By the use of relatively simple saturating logic circuitry, speeds may be obtained that are impossible for conventional adders using even the fastest non-saturating logic circuits available, with the number of states sufficiently high for computer applications.

The speed advantages of the circuit of FIGURE 1 are somewhat off-set in that the switch B being directly in the carry propagation path between the terminals T1 and T2 gives rise to a voltage drop between the terminals for each of the stages. The carry signal to be propagated along the stages is thus somewhat attenuated by each of the stages due to this voltage drop. If the switch B is a transistor operating in the saturated mode, there will be some finite voltage drop between the collector and emitter for each stage. To restore the carry signal desired to be propagated to a sufficient amplitude to be propagated to many stages, a booster element such as a transistor must be utilized in the carry propagation path. The use of the booster element, of course, increases the complexity of the circuitry and moreover greatly slows down the addition process.

In FIG. 2, there is shown a carry restoring circuit, with the switch B shown as a transistor. The carry restoring circuit is connected in each stage in the carry propagation path between the terminal T1 and the collector of the transistor switch B.

Since there is a voltage drop across the transistor B carry propagation path, it would be very desirable to have the magnitude of the carry signal voltage restored at each stage. This would be such that the voltage at the collector or junction J1 is restored to a sufficient value in each stage to propagate the carry signal through the transistor. Moreover, it would be highly advantageous to use already existing elements in the adder stage itself to help accomplish the restoring function.

Connected between the junction J1 and ground is a series circuit including a resistor RD connected to the junction J1 and a tunnel diode TD having its anode connected to the other end of the resistor RD and its cathode to ground. Connected to a junction J3, between the resistor RD and the tunnel diode TD, is the base of an inverter transistor 10. The emitter terminal of the inverter transistor 10 is connected to ground, while the collector terminal may be connected into the other logic circuitry of the adder stage itself, as will be subsequently explained.

The operation of the carry restoring circuit of FIG. 2 will be explained with reference to the adder logic as utilized therein. To prepare a string of adder stages for carry propagation, a pulse is applied to the terminal TB1 in accordance with the equation:

$$\overline{E}=X\overline{Y}+\overline{X}Y$$

The application of the pulse $\overline{E}$ to the terminal TB1 saturates the transistor B1 of the preceding adder stage $n-1$. A base current IB flows through the base resistor RB1 and through the base-emitter junction of the transistor B1. Conversely, in the stage originating the carry signal, the switch A, not shown, may be saturated instead of the switch B, to provide a similar current of equal value. A return path for the base currents of either of the transistor switches A or B is provided through the decoupling resistor RD and the tunnel diode TD of the next stage to ground.

The current versus voltage characteristic of the tunnel diode TD is shown in FIG. 3. The value of the base resistors are chosen so as to hold the tunnel diode in its low voltage state in the absence of a carry signal. This would be, for example, at point I at a voltage V1 of FIG. 3. Under these conditions, a voltage V1 across the tunnel diode TD is insufficient to switch the inverter transistor 10 to its "on" saturated state, since the base current drawn by the inverter transistor 10 is negligible. The tunnel diode TD and the decoupling resistor RD of each stage are selected to be the same or nearly the same. It follows that all junctions J1, J2 along the carry line are at the same or nearly the same voltage:

$$VJ=(IB)(RD)+V1$$

with respect to ground. Ideally, the absence of a carry signal there is an open circuit between the terminals T1 and T2, with no collector-emitter current flowing through the transistor switch B. There is, however, probably a minute current flow through the transistors B due to slight voltage differences caused by variations in the resistors and the characteristics of the tunnel diodes. T his is very small and not cumulative and therefore of no consequence.

In the "carry absence" state, there is no limit to the number of stages that may be connected in tandem. This is regardless of saturation resistance of the carry line switching transistor B.

In order to retain the very desirable feature of an unlimited number of adder stages for the "carry present" state, that is when a carry signal is to be propagated along the carry line, there should again be no steady state voltage difference between the junction points J1 along the carry line for the various stages. This may be described in another way, for operation of an unlimited number of stages it is necessary that the carry signal be used only as a switching trigger rather than being used to hold the entire string of stages in the "carry present" state.

It is well known that a tunnel diode may be operated in switching mode, that is, having two stable states. Another stable state of FIG. 3 may be reached by increasing the current passing through the tunnel diode over the peak value of current so that the diode will switch down into its valley region to the point II at the relatively high voltage V2. In the present application, the carry signal is used to trigger each stage which then stays on and turns on the next stage along the line. As the first tunnel diode of an adder stage is triggered by the carry pulse, the operating point of the tunnel diode switches from I to II. The increase of voltage across the tunnel diode turns on the inverter transistor 10, which has its base connected to the point J3. Although the tunnel diode current has decreased from a relatively high value at point I to a lower value at point II the current IB remains substantially the same after the tunnel diode has switched. This is so because a base current roughly equal to the decrease in current through the tunnel diode is now drawn by the inverter transistor 10, provided that the pulse $\overline{E}$ applied to the transistor B1 at the terminal TB1 resembles one from a current source. The different slopes of the load and the characteristics of the tunnel diodes. This is very line for the two points I and II of the tunnel diode characteristic are due to the changes in source voltage and series resistor when the inverter transistor is either in its saturated or unsaturated state.

At state II of the tunnel device, the voltage across the decoupling resistor RD remains approximately the same, since the current passing through the resistor is substantially the same; thus the increase in voltage across the tunnel diode TD also causes the voltage at the point J1 of FIG. 2 to rise. The voltage now at this point is:

$$VC=(IB)(RD)+V2$$

plus any additional voltage due to the carry trigger pulse passing through the transistor B1. Even if the trigger pulse is removed, the voltage at the point J1 is now higher than required to trigger the tunnel diode of the next adder stage. If the above conditions are met, any number of stages can be triggered "on" in this manner. Once the triggering action has been propagated to all the stages, all the points J1, J2 along the carry line are at a steady state "carry present" voltage level, since once the tunnel diodes have been triggered they remain "on" after being triggered. The tunnel diodes TD and the inverters 10 may be returned to their off state by interrupting or sufficiently reducing the base current IB.

It should be noted that the speed of carry propagation can be increased by moving the operating point I in the low voltage state V1 as close to the peak of the characteristic curve of the tunnel diode as possible, where only a small increase in current through the tunnel diode will switch the tunnel diode to its high voltage operating point II. Of course, the speed of carry propagation may be increased by using carry line transistors having a low saturation resistance.

Referring now to FIG. 4, a complete adder stage is shown implementing the restoring circuitry to provide a full adder with the carry restoring function included therein. The high speed adder of FIG. 4 includes only two inverted exclusive OR logic elements and three inverter circuits. The switch B is in the carry line, while the switch A is not required, as will be explained. The inverted exclusive OR logic function is one in which if the inputs to the logic elements are X and Y, the output E will be:

$$E=XY+\overline{XY}$$

The inverter logic function is such that the output is the complement of the input signal.

In FIG. 4, the inputs X and Y are applied to the inverted exclusive OR elements 12 through the terminals 14 and 16, respectively. The output E of the inverted exclusive OR 12, is applied to the inverter element 18 which provides an output E. The output E supplies one of the inputs for the inverted exclusive OR element 20. The carry input signal C at the terminal T1 is used to trigger the carry restoring circuit 22, as discussed above. The carry input signal, in turn, triggers the inverter logic element 10, the same element as transistor 10 of FIG. 2, to supply the complement of the carry signal. The complement of carry signal $\overline{C}$ is supplied at the other input of the inverted exclusive OR element 20. As shown above, the expression for the sum of two incoming signals can be expressed:

$$S=EC+\overline{EC}$$

which will be the output supplied at the terminal 26 of the inverted exclusive OR element 20, with the inputs $\overline{E}$ and $\overline{C}$ applied thereto. The output E of the inverted exclusive OR element 12 is also applied to the inverter 28. The output $\overline{E}$ of the inverter 28 is utilized to control the saturating switch B in the carry line. As is shown above, the proper logic function necessary to control the switch B is $\overline{E}$, as expressed by:

$$\overline{E}=B=X\overline{Y}+\overline{X}Y$$

According to the truth table for a full adder, when both of the inputs X and Y are "1," the adder stage must generate its own carry output signal C*. Or expressed in terms of switch A of FIG. 1, the switch A must be operated in accordance with the expression:

$$A=XY$$

This function is commonly known as the AND function. In FIG. 4, the output XY is provided without the necessity of a separate switch A by the inverted exclusive OR element 12 itself. The output XY is applied to the junction J2 to supply the generated carry output signal when the necessary input conditions are present. Reference is made herein to copending application Serial No. 313,653, filed October 3, 1963, and application Serial No. 314,174, filed October 7, 1963, both have the same inventor as the present application, and referring, respectively, to adder circuitry eliminating the need for a carry generating switch A; and for inverted exclusive OR elements capable of generating an AND function at a separate output.

The full adder circuit of FIG. 4 incorporating the carry restoring feature embodied in the block 22 generates the necessary logic functions to provide the sum output signal S, and also the necessary control signals for controlling the carry line switch B and providing the carry generating function XY.

Figure 5:
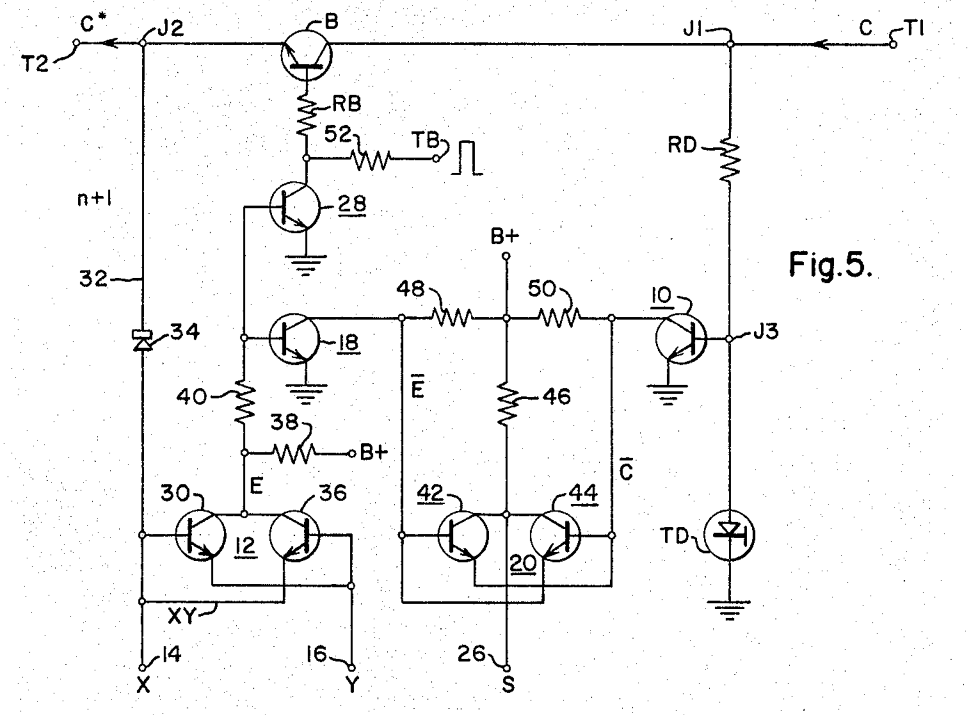
FIG. 5 is a schematic diagram implementing the block diagram of FIG. 4.

FIG. 5 is a schematic diagram showing the actual circuitry from which the block diagram of FIG. 4 can be fabricated. The inverted exclusive OR circuit 12 as shown in FIG. 4 includes the transistors 30 and 36. The input X, at the terminal 14, is applied to the base of the transistor 30. The carry generating line 32 including the diode 34 is connected between the junction J2 and the input terminal 14. The emitter of the transistor 36 is connected to the carry generating line 32 adjacent the terminal 14 and provides the output $A=XY$. The collectors of the transistors 30 and 36 are connected together to supply an output signal E, as defined above. The input Y is applied through the terminal 16 to the base of the transistor 36, with the emitter of the transistor 30 connected at the terminal 16. The logic element 12 is biased by the source of potential B+, not shown, through the resistor 38 connected to the collectors of the transistors 30 and 36. The function of the inverted exclusive OR 12 is such that: if both X and Y are "0" then E is "1" and XY is "0," with both transistors being cut-off. If now X is "0" and Y is "1," transistor 30 will still be off but transistor 36 will be conducting so that E will be "0" and XY will be "0." If X is "1" and Y is "0" transistor 30 will be conducting and transistor 36 will be non-conducting so that again the output E will be "0," and the output XY will be "0." If both inputs X and Y are "1" both transistors will be in their non-conducting state so that both E and XY will be at a "1" state. From this analysis, it can be seen that the necessary functions E and XY are generated by the inverted exclusive OR element 12.

The output E from the collectors of the transistors 30 and 36 is applied through the base resistor 40 to the base of the inverter transistor 18. The emitter of the transistor 18 is grounded while the collector supplies the signal $\overline{E}$ to the base of the transistor 42 of the inverted exclusive OR element 20. The emitter and base electrodes of the transistors 42 and 44 are crossconnected while the collectors are commonly connected. The collectors of the transistors 42 and 44 are connected to the load resistor 46 to the source B+, not shown. Between the bases and the B+ source are connected the load resistors 48 and 50, respectively, of the transistors 42 and 44. The output for the logic element 20 is taken from the collectors of transistors 42 and 44 at the terminal 26, which supplies sum signal S of the incoming signals X and Y, and C. The complement carry input signal $\overline{C}$ is applied to the base of the transistor 44 from the collector of the inverter transistor 10. The base of transistor 10 is connected at the junction J3 between the decoupling resistor RD and the anode of the tunnel diode TD. The other end of the resistor RD is connected to the junction J1 of the carry line at the terminal T1. The cathode of the tunnel diode TD is grounded. The inputs then to the logic element 20 are $\overline{E}$ and $\overline{C}$ which generates the sum signal S at the terminal 26, as explained above.

The output E from the logic element 12 is also applied to the base of the inverter transistor 28, which has its emitter grounded and collector connected to the base of the carry line transistor B through the resistor RB. The setting pulses for the transistor B are applied through the resistor 52 at the terminal TB, when it is desired to set each of the stages for carry propagation as explained above. The collector and emitter of transistor B are connected between the junctions J1 and J2 with the carry input signal C being applied to the terminal T1 from a preceding stage $n-1$ and the carry output signal C* being propagated or generated within the stage and transmitted to a succeeding state $n+1$ at the terminal T2.

It should be noted that the circuit of FIG. 5 generates the necessary logic functions to supply the sum signal of the incoming signals X and Y, while also providing the necessary logic control functions to either propagate a carry signal or to generate a carry signal to satisfy the truth table. The carry restoring function is incorporated directly into the adder circuitry by the addition only of the resistor RD and the tunnel diode TD. The tunnel diode is triggered by the carry input signal itself to switch to its high voltage stage thus supplying sufficient voltage to cause the transistor 10 to switch its conducting state and provide the complement carry signal $\overline{C}$. Moreover, the tunnel diode TD now being in its high voltage state permits the voltage at the junction J1 to remain high. Since the tunnel diode is in its high voltage state, the voltage at the junction J1 is also at a relatively high voltage, which permits the carry signal to be restored at each stage without any substantial attenuation.

Thus, an unlimited number of stages may be connected in tandem since there is no appreciable voltage difference between the carry input junction and the carry output junction of each stage due to the restoring function of the tunnel diode. It may be desirable in certain instances to use some sort of biasing means in series with the tunnel diode in order to modify its characteristic curve slightly so that the switching function may occur at the particular voltage and current levels. This may be done by either connecting a bias battery in series with the tunnel diode to bias the diode to a predetermined operating point. Alternately, a semiconductor device such as a backward diode, well known in the art, having preretermined characteristics may be utilized to so bias the tunnel diode. It should also be noted that other semiconductor devices besides tunnel diodes which have the similar characteristics may be used in place of tunnel diodes. These devices should be operative in two stable states having a low voltage operating point and a high voltage operating point. The use of such a device would not interfere with the operation of the adder circuit as described. Furthermore, PNP as well as the NPN transistors shown may be utilized in the circuitry, by reversing TD and the polarity of the voltage source.

Although the present invention has been described with a certain degree of particularity, it should be understood that the present disclosure has been made only by way of example and that numerous changes in the details of circuitry and the combination and arrangement of elements may be resorted to without departing from the scope and spirit of the present invention.

I claim as my invention:

1. In computer adder circuitry having a switch connected in a carry propagation line, the combination of: a carry restoring circuit comprising bistable switching means operatively connected across the carry propagation line, said bistable switching means being capable of operation in two operating states with one of said states being indicative of a carry signal and being operative to change states in response to control signals being applied thereto to establish the carry propagation line at a voltage level indicative of a carry for propagation of carry signals through said switch, when open and along the carry propagation line.

2. In computer adder circuitry having a transistor switch connected in a carry propagation line, the combination of: a carry restoring circuit comprising semiconductor switching means operatively connected across the carry propagation line, said switching means being capable of bistable operation in a low and a high voltage operating state with one of said states being indicative of a carry signal and being operative to change to the voltage state indicative of a carry signal in response to control signals being applied thereto to establish the carry propagation line at a carry voltage level for propagation of carry signals through said transistor switch, when open.

3. In high speed computer adder circuitry having a plurality of stages each having a saturable transistor switch operative to be saturated before carry propagation from a preceding stage connected in a carry propagation line common to all stages, the combination of: a carry restoring circuit in each stage comprising a tunnel diode operatively connected across the carry propagation line, said tunnel diode having a low and a high voltage operating state with one of said states being indicative of a carry signal and being operative to change to the voltage state indicative of a carry in response to control signals being applied thereto from a previous stage to establish the carry propagation line at a carry voltage level for propagation of carry signals from a preceding stage through said saturated transistor switch.

4. In computer adder circuitry having a switch connected in a carry propagation line, the combination of: a carry restoring circuit in each stage comprising switching means operatively connected across the carry propagation line, said switching means being capable of bistable operation in a low and a high voltage operating state with one of said states being indicative of a carry signal and being operative to change to the voltage state indicative of a carry signal in response to control signals being applied thereto to establish the carry propagation line at a carry voltage for propogation of carry signals from a preceding stage through the switch in the carry propagation line, when closed; and logic means to generate carry output signals or signals to activate the switch to permit propagation of carry signals from a preceding stage through the state in response to input signals.

5. In high speed computer adder circuitry having a plurality of stages each having a saturable transistor switch connected in a carry propagation line common to all stages, the combination of: a carry restoring circuit in each stage comprising semiconductor switching means operatively connected across the carry propagation line, said switching means being capable of bistable operation in a low and a high voltage operating state with one of said states being indicative of a carry signal and being operative to change to the voltage state indicative of a carry signal in response to control signals from a preceding stage being applied thereto to establish the carry propagation line at a carry voltage for propagation of carry signals from a preceding stage through saturable transistor switch; and logic means in each stage to generate carry output signals or saturating signals to saturate the saturable transistor switch to permit propagation of carry signals from a preceding stage through the stage in response to input signals to that stage.

6. In high speed computer adder circuitry having a saturable transistor switch connected in a carry propagation line, the combination of: a carry restoring circuit in each stage comprising a tunnel diode operatively connected across the carry propagation line, said tunnel diode having a low and high voltage operating state with one of said states being indicative of a carry signal and being operative to change to the voltage state indicative of a carry in response to control signals being applied thereto to establish the carry propagation line at a carry voltage level for propagation of carry signals from a preceding stage through said saturable transistor switch; and logic means to generate carry output signals or saturating signals to saturate the saturable transistor switch to permit propagation of carry signals from a preceding stage through the stage in response to input signals.

7. In high speed computer adder circuitry having a plurality of stages each having a saturable transistor which operative to be saturated before carry propagation from a preceding stage connected in a carry propagation line common to all stages, the combination of: a carry restoring circuit in each stage comprising a tunnel diode operatively connected across the carry propagation line, said tunnel diode having a low and a high voltage operating state with one of said states being indicative of a carry signal and being operative to change to the voltage state indicative of a carry in response to control signals being applied thereto from a preceding stage to establish the carry propagation line at a carry voltage level for propagation of carry signals from a preceding stage through said saturable transistor switch; sum logic means in each stage operative to generate sum signals in response to input signals to that stage and carry signals from preceding stages; and carry logic means in each stage to generate output signals to saturate the saturable transistor switch to permit propagation of carry signals from a preceding stage through the stage in response to input signals to that stage.

References Cited by the Examiner

UNITED STATES PATENTS 3,053,452 9/1962 Kilburn et al. -------- 235—175

ROBERT C. BAILEY, *Primary Examiner.*

G. D. SHAW, *Assistant Examiner.*